(12) United States Patent
Holz (10) Patent No.: US 7,658,105 B2
(45) Date of Patent: Feb. 9, 2010

(54) FUEL GAUGE CAP

(75) Inventor: Michael Joseph Holz, West Bend, WI (US)

(73) Assignee: Bemis Manufacturing Company, Sheboygen Falls, WI (US)

(*) Notice: Subject to any disclaimer, the term of this patent is extended or adjusted under 35 U.S.C. 154(b) by 522 days.

(21) Appl. No.: 11/549,141

(22) Filed: Oct. 13, 2006

(65) Prior Publication Data

US 2007/0164031 A1 Jul. 19, 2007

Related U.S. Application Data (60) Provisional application No. 60/727,088, filed on Oct. 14, 2005.

(51) Int. Cl.
*G01F 23/30* (2006.01)
(52) U.S. Cl. ...................................... 73/320; 73/290 R
(58) Field of Classification Search .................... 73/320, 73/290 R
See application file for complete search history.

(56) References Cited

U.S. PATENT DOCUMENTS

| 1,272,436 | A | * | 7/1918 | Hastings | ....................... 73/320 |
| 4,676,390 | A | | 6/1987 | Harris | |
| 4,724,706 | A | | 2/1988 | Stiever | |
| 4,830,213 | A | | 5/1989 | Sleder | |
| 4,838,083 | A | | 6/1989 | Blomquist | |
| 4,887,733 | A | * | 12/1989 | Harris | .................... 220/203.06 |
| 4,970,896 | A | * | 11/1990 | Larson et al. | .................. 73/320 |
| 4,991,436 | A | * | 2/1991 | Roling | ......................... 73/320 |
| 5,224,379 | A | | 7/1993 | Koebernik et al. | |
| 5,435,181 | A | | 7/1995 | Koebernik | |
| D580,807 | S | * | 11/2008 | Xi-Ren | ....................... D10/101 |
| 2002/0166377 | A1 | * | 11/2002 | Baron et al. | ............... 73/290 R |
| 2007/0000318 | A1 | * | 1/2007 | Nicosia et al. | ............. 73/290 R |

* cited by examiner

*Primary Examiner*—Hezron Williams
*Assistant Examiner*—Rodney T Frank
(74) *Attorney, Agent, or Firm*—Michael Best & Friedrich LLP (57) ABSTRACT

A fuel cap operable to close an opening of a fuel tank. The fuel cap includes an outer shell having a protrusion and a shell locking member. The fuel cap includes a detection mechanism for sensing a level of fuel within the tank. The fuel cap further includes an assembly component engageable with the outer shell to support the detection mechanism on the outer shell. The assembly component defines a groove operable to receive the protrusion. Additionally, the assembly component includes a component locking member. The outer shell and the assembly component are engageable with one another by a relative axial movement followed by a relative rotational movement about an axis. Once engaged, the outer shell and the assembly component are fixed against disengagement by engagement of the shell locking member and the component locking member.

20 Claims, 10 Drawing Sheets

FUEL GAUGE CAP

CROSS-REFERENCE TO RELATED APPLICATIONS

Priority is hereby claimed to U.S. Provisional Patent Application Ser. No. 60/727,088 filed on Oct. 14, 2005, the entire contents of which is incorporated herein by reference.

BACKGROUND

The present invention relates to fuel gauge caps. More particularly, the invention relates to an improved structure and method for assembly of a fuel gauge cap.

SUMMARY

In one embodiment, the invention provides a fuel cap operable to close an opening of a fuel tank. The fuel cap includes an outer shell having a protrusion and a shell locking member. The fuel cap includes a detection mechanism for sensing a level of fuel within the tank. The fuel cap further includes an assembly component engageable with the outer shell to support the detection mechanism on the outer shell. The assembly component defines a groove operable to receive the protrusion. Additionally, the assembly component includes a component locking member. The outer shell and the assembly component are engageable with one another by a relative axial movement followed by a relative rotational movement about an axis. Once engaged, the outer shell and the assembly component are fixed against disengagement by engagement of the shell locking member and the component locking member.

In another embodiment, the invention provides a fuel cap for closing an opening of a fuel tank and for displaying a level of fuel in the tank. The cap includes an outer shell having an interior region. The outer shell includes a first protrusion and a second protrusion having different proportions and extending into the interior region. The fuel cap includes a detection mechanism for sensing and responding to the level of fuel in the tank. The fuel cap further includes an assembly component defining grooves for receiving a portion of the detection mechanism. The assembly component defines a first slot and a second slot for respectively engaging the first protrusion and the second protrusion.

In yet another embodiment the invention provides a method of assembling a fuel cap for closing an opening of a fuel tank. The cap includes an outer shell having a protrusion formed thereon and an assembly component formed with an L-shaped slot including an axial portion and a lateral portion. The method comprising the acts of axially joining the outer shell and the assembly component such that the protrusion is received in the axial portion of the L-shaped slot, rotating the outer shell and the assembly component relative to each other about an axis such that the protrusion moves from the axial portion to the lateral portion of the L-shaped slot, and automatically locking the outer shell and the assembly component against substantial relative rotation about the axis.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
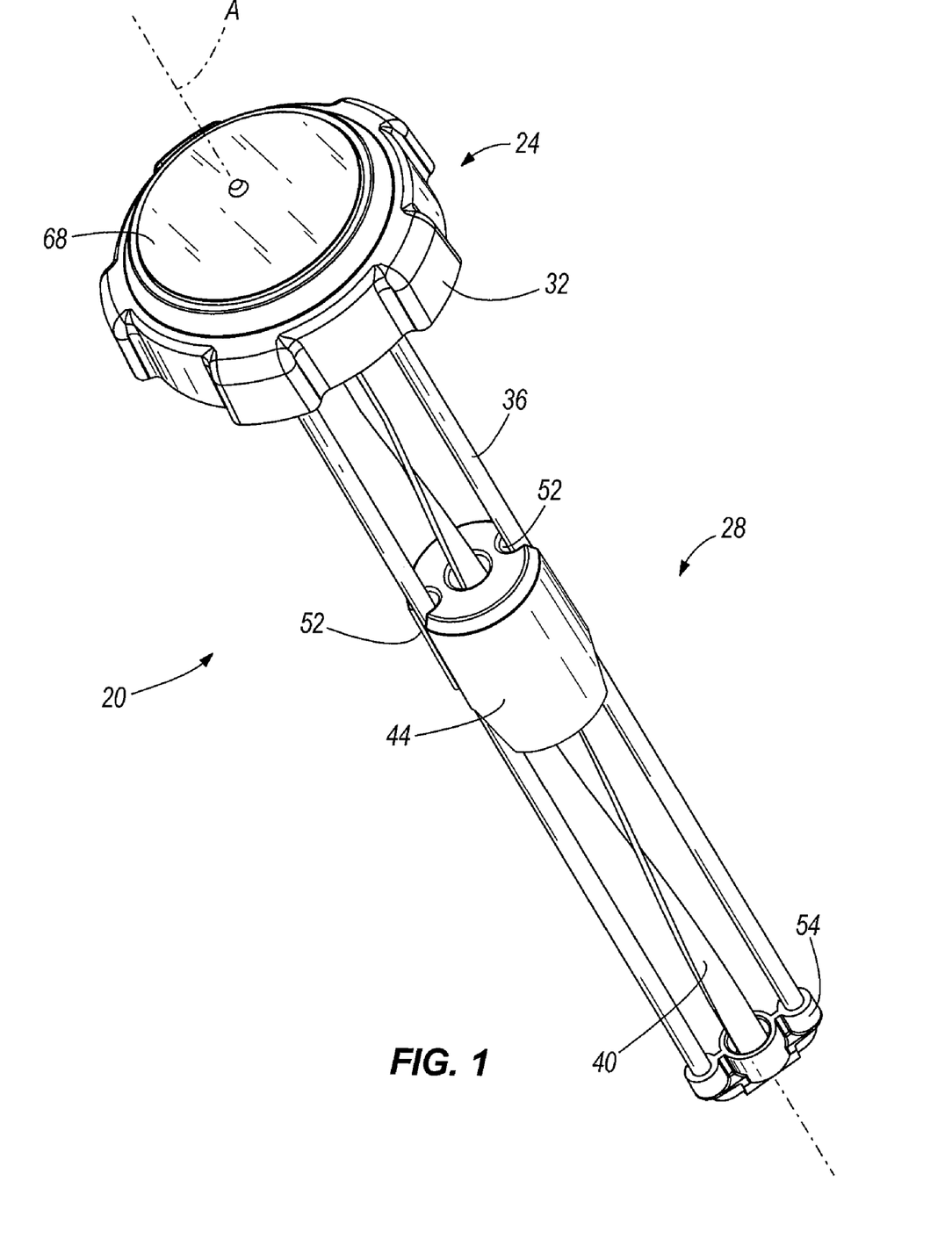
FIG. 1 is a perspective view of a fuel cap.
Figure 2:
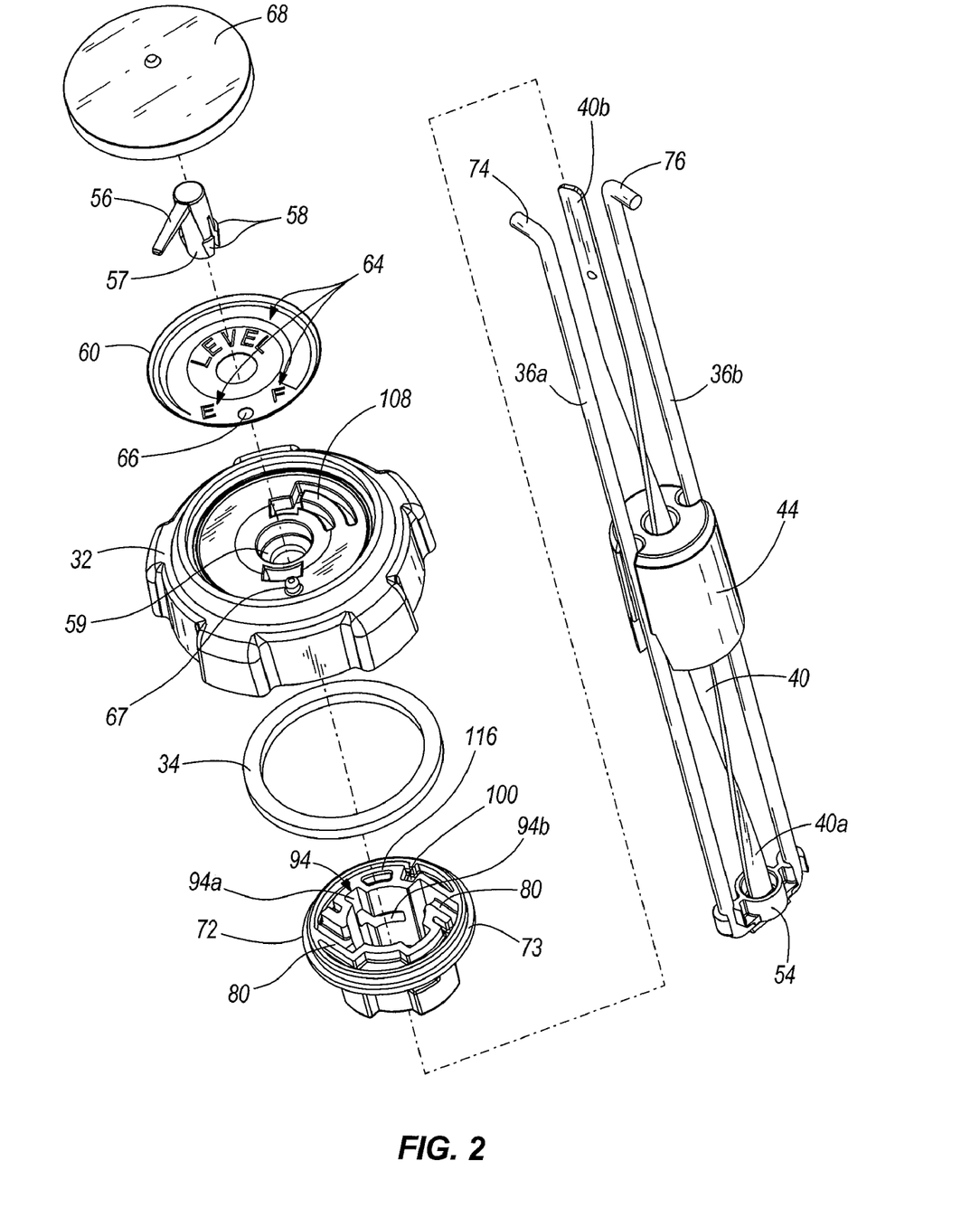
FIG. 2 is an exploded assembly view of the fuel cap of FIG. 1.
Figure 3:
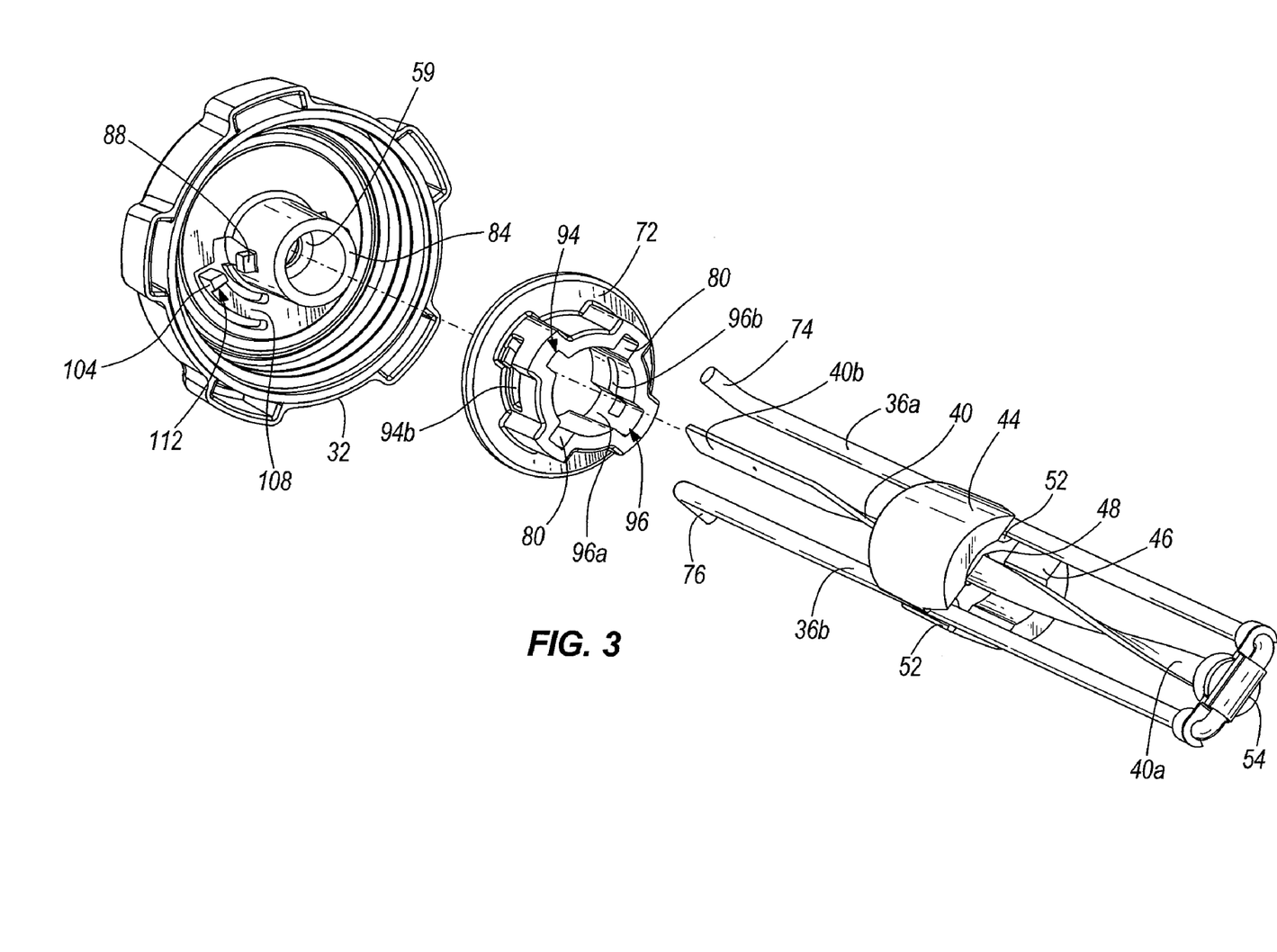
FIG. 3 is an exploded assembly view of a portion of the fuel cap of FIGS. 1 and 2.

FIGS. 1 and 2 illustrate a fuel cap 20 for use with a container (not shown) such as a fuel tank having a threaded opening. The fuel cap 20 includes a closure portion 24 and a level detection mechanism 28. The closure portion 24 includes an outer shell 32 having threads for engaging the threaded opening. A sealing element 34 provides a seal between the closure portion 24 and the threaded opening. The level detection mechanism 28 includes a frame 36 having two legs 36a and 36b, an output rod 40, and a float member 44. The float member 44 is buoyant in most liquids (e.g., gasoline, diesel fuel, etc.) such that it is responsive to the level of fuel within the tank as described in further detail below. As shown in FIG. 3, the float member 44 is formed with a recessed portion 46 and a slot 48. The slot 48 is formed through the central portion of the float member 44 along a main axis A of the fuel cap 20 and is configured for engaging the output rod 40 in a close-fitting manner. The float member 44 is additionally formed with guide slots 52 parallel to the main axis A and configured to receive the frame legs 36a and 36b.

Figure 13:
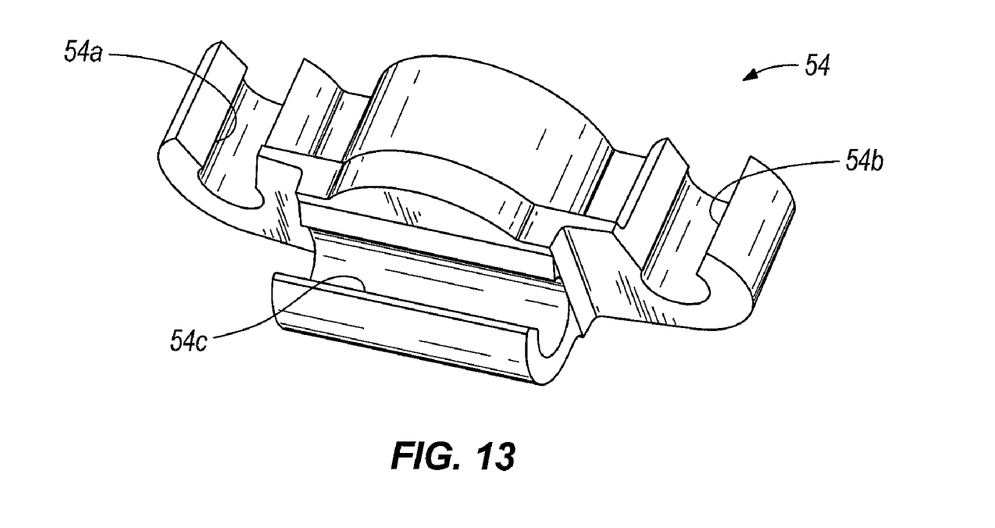
FIG. 13 is a perspective view of an end cap for the fuel cap.
Figure 14:
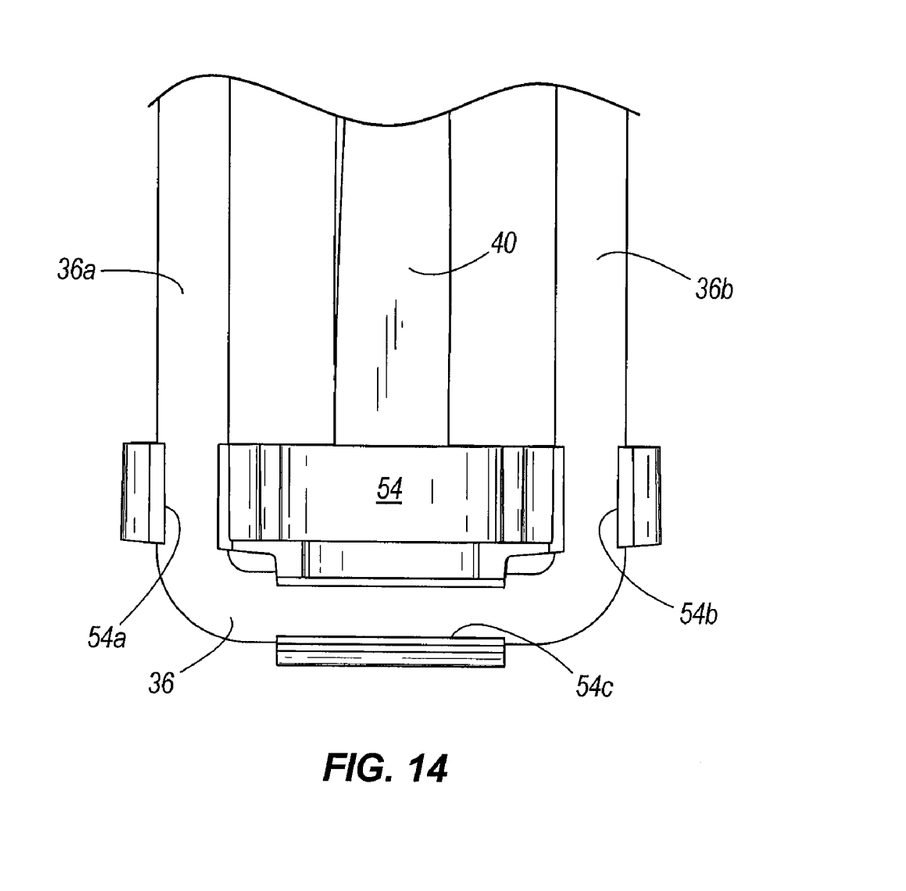
FIG. 14 is a front detail view of the fuel cap, illustrating the attachment locations for the end cap of FIG. 13.

An end cap 54 is coupled to the frame 36 to retain the output rod 40 in position, axially whether stationary or rotating about the main axis A. The end cap 54 snaps onto the frame 36 from the side at three locations with grooves 54a and 54b engaging the respective frame legs 36a and 36b and a third groove 54c engaging the horizontal portion of the frame 36 between the two legs 36a and 36b (see FIGS. 13 and 14). The output rod 40 has a substantially flat cross-section and includes a first end 40a and a second end 40b. The output rod 40 is non-planar between the first end 40a and the second end 40b. In some embodiments, the output rod 40 has an overall twist angle between the first end 40a and the second end 40b of between about 180 degrees and about 360 degrees. In some embodiments, the overall twist angle is about 288 degrees. The second end 40b of the output rod 40 is coupled to an indicator needle 56 such that rotation of the output rod 40 coincides with similar rotation of the indicator needle 56. The indicator needle 56 includes a base 57 formed with barbs 58 on an exterior surface thereof. The outer shell 32 is formed with an inner annular lip or projection 59 for engaging the barbs 58 when the indicator needle 56 is pressed into the outer shell 32. The base 57 is split along its length to allow elastic compression of the base 57 as the indicator needle 56 is inserted into the outer shell 32. When the barbs 58 snap over the projection 59, the base 57 returns to its previous, non-compressed shape, and the indicator needle 56 is retained in axial position relative to the outer shell 32.

An indicator dial 60 includes indicia 64 associated with the fuel level within the associated tank. In some embodiments, the indicator dial 60 is constructed of a metallic material, such as aluminum, and the indicia 64 are printed thereon. In some embodiments, the indicia 64 are inscribed in, integrally formed with, or adhesively coupled to the indicator dial 60. The indicator dial 60 includes an aperture 66, which is engageable with a post 67 formed as part of the outer shell 32 to register the indicator dial 60 and the outer shell 32 in a predetermined relative orientation. Other methods of registering the indicator dial 60 and the outer shell 32 are within the scope of the invention. A lens or "crystal" 68 covers the indicator needle 56 and the indicator dial 60. The crystal 68 is constructed of a highly transparent material to allow a user to clearly see the position of the indicator needle 56 in relation to the indicia 64. The crystal 68 is mounted to the outer shell 32 by a weld, such as an ultrasonic weld. In some embodiments, the crystal 68 is mounted to the outer shell 32 by a snap fit, adhesive or cohesive bonding material, or another appropriate means.

Figure 4:
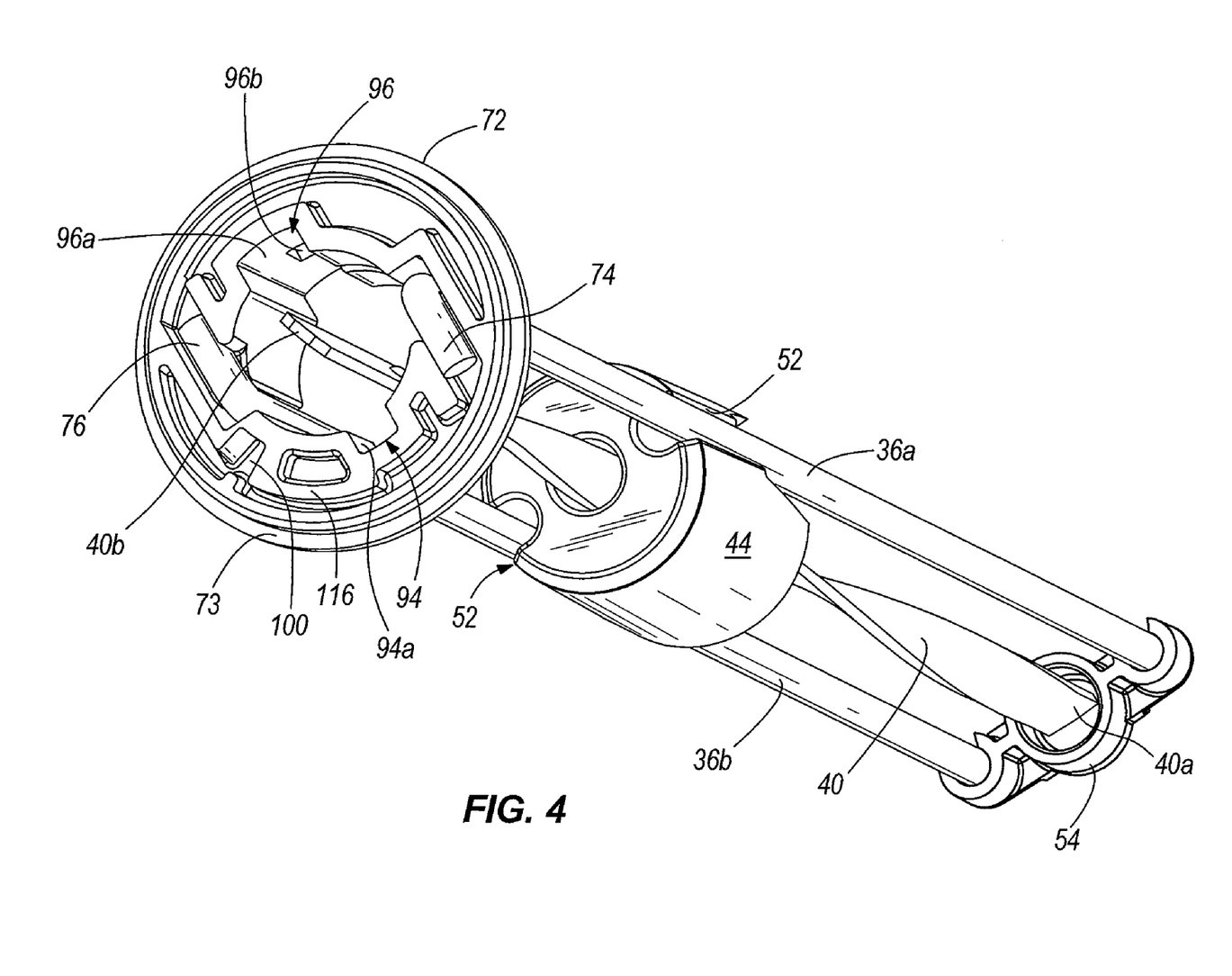
FIG. 4 is a perspective view of the fuel cap of FIGS. 1-3 in a first partially assembled state.
Figure 5:
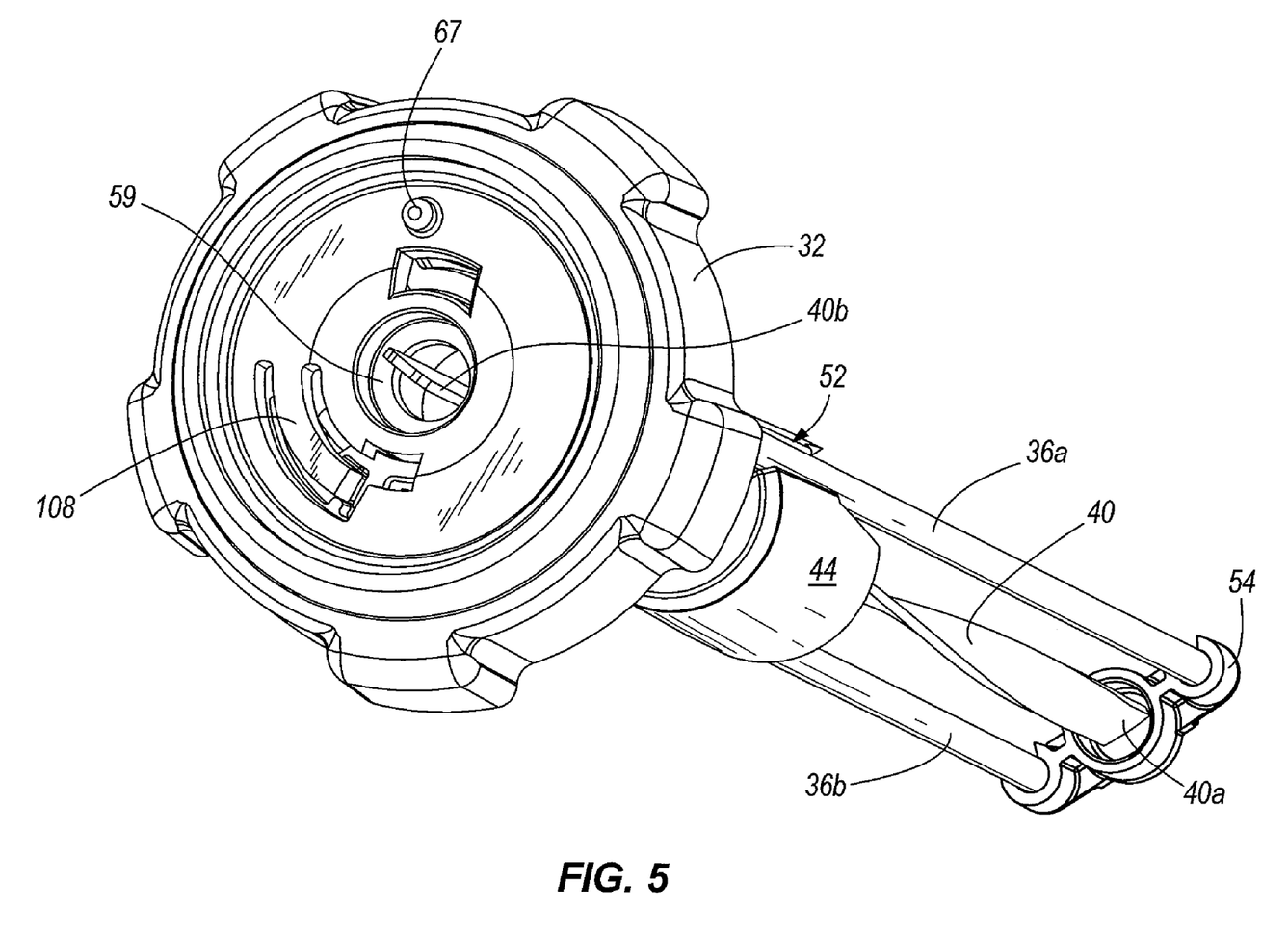
FIG. 5 is a perspective view of the fuel cap of FIGS. 1-4 in a second partially assembled state.

The fuel cap 20 includes an assembly component 72 coupled to the outer shell 32 and to the frame 36. The assembly component 72 includes a flange 73 for engaging the sealing element 34 as discussed below. The frame legs 36a and 36b include respective ends 74 and 76, which are bent about 90 degrees from the frame legs 36a and 36b. The assembly component 72 is formed to include a pair of slots 80 for receiving the ends 74 and 76. The slots 80 are open toward the "top" or "outer" side of the fuel cap 20. When the ends 74 and 76 are received within the respective slots 80 as shown in FIG. 4, the frame 36, the output rod 40, and the float member 44 are coupled to the assembly component 72 to rotate therewith (e.g., during cap installation and removal). The assembly of the frame 36 and the assembly component 72 is not direction-specific (i.e., either of the frame ends 74 and 76 can be received in either of the slots 80). The assembly of the indicator needle 56 to the second end 40b of the output rod 40 is direction-specific to ensure that the indicator needle 56 indicates "empty" when the float member 44 is substantially all the way down and indicates "full" when the float member 44 is substantially all the way up.

Figure 12:
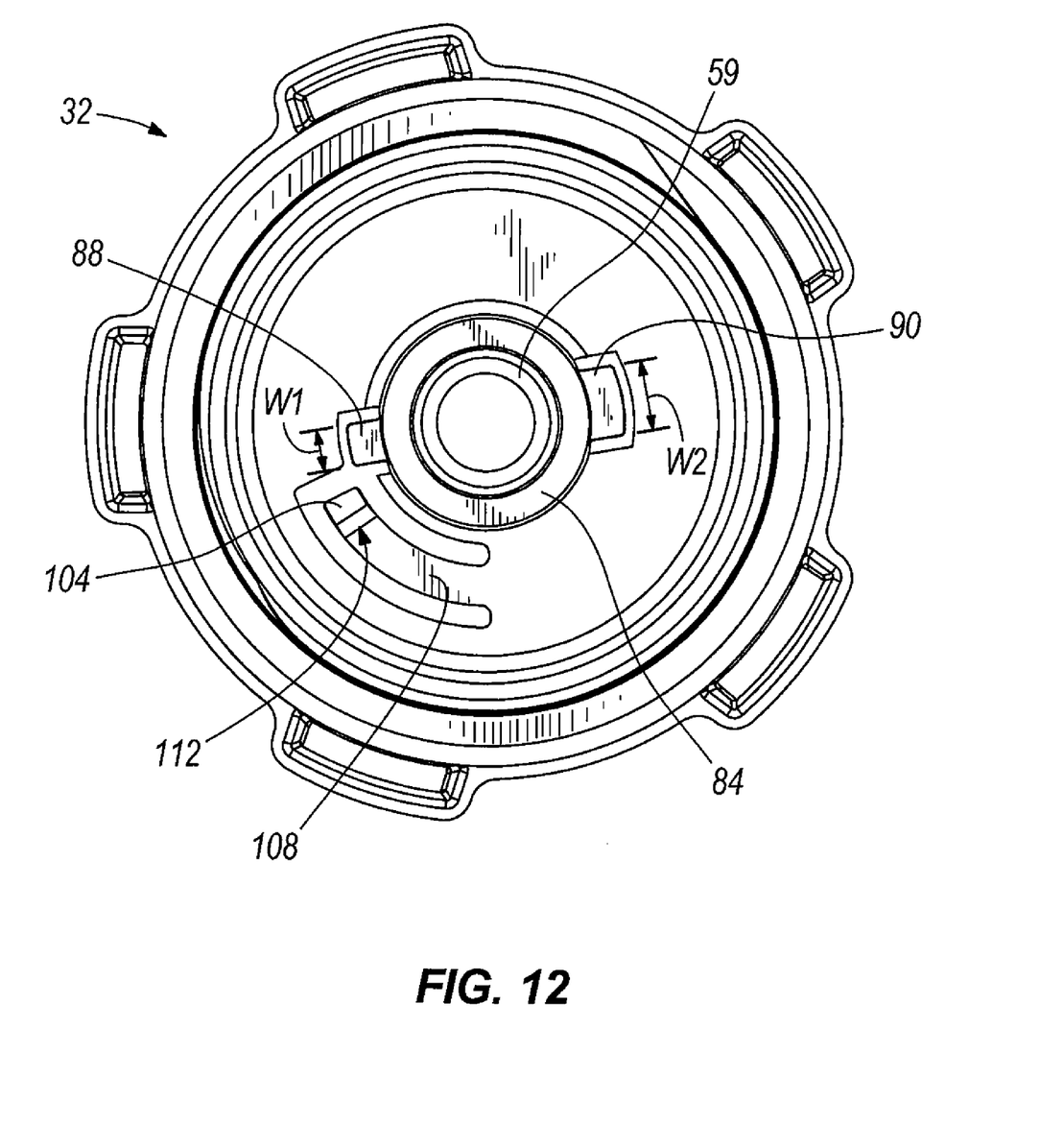
FIG. 12 is a bottom view of an outer shell of the fuel cap of FIGS. 1-6.

FIGS. 2 and 3 illustrate the interconnecting features of the outer shell 32 and the assembly component 72. The outer shell 32 is formed with a boss 84 in its interior region. The boss 84 is generally cylindrical and is open in its center to allow the output rod 40 to pass through to the top side of the outer shell 32. The boss 84 is formed to include a first protrusion 88 and a second protrusion 90 as shown in FIG. 12. The first and second protrusions 88 and 90 are evenly spaced about the circumference of the boss 84 and have dissimilar size. Specifically, the first protrusion 88 is smaller than the second protrusion 90. In some embodiments, the first and second protrusions 88 and 90 have dissimilar shape, regardless of their relative size. In some embodiments, the outer shell 32 includes a single protrusion rather than two dissimilar protrusions.

The assembly component 72 includes first and second slots 94 and 96 for engagement with the first and second protrusions 88 and 90, respectively. The first slot 94 includes a first portion 94a oriented substantially parallel to the main axis A and a second portion 94b oriented substantially perpendicular to the main axis A. Likewise, the second slot 96 includes a first portion 96a oriented substantially parallel to the main axis A and a second portion 96b oriented substantially perpendicular to the main axis A. Thus, the first and second slots 94 and 96 are generally L-shaped. The respective first portions 94a and 96a are spaced circumferentially on the assembly component 72 to align with the first and second protrusions 88 and 90, respectively. The first portion 94a of the first slot 94 has a width substantially equal to the width W1 of the first protrusion 88, and the first portion 96a of the second slot 96 has a width substantially equal to the width W2 of the second protrusion 90. The second portions 94b and 96b are open to the first portions 94a and 96a, respectively allowing the protrusion 88 to be moved from the first portion 94a to the second portion 94b and the protrusion 90 to be moved from the first portion 96a to the second portion 96b when the outer shell 32 and the assembly component 72 are rotated relative to each other about the main axis A.

In addition to the mating protrusions 88 and 90 and slots 94 and 96, the outer shell 32 and the assembly component 72 include respective locking members. The assembly component 72 includes a recess 100 for receiving a detent 104 of the outer shell 32. The detent 104 is positioned on the distal end of a snap lever or finger 108. Although formed as part of the outer shell 32 in the illustrated embodiment, the snap lever 108 is flexible and elastically deformable such that the detent 104 is movable relative to the remainder of the outer shell 32. The detent 104 includes a ramped edge 112 on the side facing the snap lever 108. The detent 104 engages a ridge 116 bordering the recess 100 during assembly as described in further detail below.

Assembly of the fuel cap 20 is designed to be relatively simple. The float member 44 is inserted into the frame 36 by gently pulling the frame legs 36a and 36b apart. The output rod 40 is threaded into the central slot 48 in the float member 44. The end cap 54 is snapped onto the frame 36 to retain the first end 40a of the output rod 40 and provide a stop for the float member 44, defining its "empty" position. The frame legs 36a and 36b are gently squeezed together and inserted into the slots 80 in the assembly component 72. Because of the orientation of the two frame ends 74 and 76 in the slots 80, torsional strength between the assembly component 72 and the frame is high without the need for adhesives or welding. Another benefit of this orientation is that it yields a large amount of space in the center of the fuel cap 20 without a large outside diameter of the fuel cap 20. This allows the output rod 40 and the indicator needle 56 to be positioned along the main axis A in the fuel cap 20, coplanar with the two frame legs 36a and 36b, enabling a wide sweep range of the indicator needle 56 across the indicator dial 60. For example, in the illustrated embodiment, approximately 80 percent of the indicator dial 60 is within the sweep range of the indicator needle 56. This is useful to the user, who is able to read the fuel level quickly and more accurately.

The outer shell 32 is joined axially with the assembly component 72 such that the first protrusion 88 enters the first portion 94a of the first slot 94 and the second protrusion 90 enters the first portion 96a of the second slot 96. The outer shell 32 and the assembly component 72 are pressed axially together to align the first and second protrusions 88 and 90 with the second portions 94b and 96b of the respective slots 94 and 96. When the outer shell 32 and the assembly component 72 are pressed axially together, the snap lever 108 is deformed, flexing outwardly due to contact of the detent 104 with the ridge 116 of the assembly component 72. The outer shell 32 and the assembly component 72 are rotated relative to one another about the main axis A such that the first and second protrusions 88 and 90 move toward the closed ends of the second slot portions 94b and 96b of the respective slots 94 and 96. After sufficient relative rotation between the outer shell 32 and the assembly component 72 in this manner, the detent 104 becomes aligned with the recess 100, allowing the snap lever 108 to snap back into its non-flexed state.

The detent 104 being located in the recess 100 prevents substantial relative rotation between the outer shell 32 and the assembly component 72 about the main axis A. The positioning of the first and second protrusions 88 and 90 in the second slot portions 94b and 96b prevents substantial axial movement between the outer shell 32 and the assembly component 72. Thus, the outer shell 32 and the assembly component 72 are easily assembled, but not easily disassembled. The only way to pull the outer shell 32 and assembly component 72 axially apart is to align the first and second protrusions 88 and 90 with the first slot portions 94a and 96a, which requires breakage of the detent 104 or prying up of the snap lever 108 to remove the detent 104 from the recess 100.

Further assembly of the fuel cap 20 includes laying the indicator dial 60 onto the outer shell 32 such that the post 67 engages the aperture 66 in the indicator dial 60. In this position, the indicator dial 60 lies directly on top of the snap lever 108, substantially preventing the snap lever 108 from being upwardly flexed to remove the detent 104 from the recess 100. Once the indicator dial 60 is in place, the indicator needle 56 is pressed onto the second end 40b of the output rod 40, and the crystal 68 is fixedly coupled to the outer shell 32 by ultrasonic welding. Thus, the fuel cap 20 cannot be disassembled or tampered with once assembled, unless it is cracked, severed, or broken in some way.

When the fuel cap 20 is installed with a fuel tank, the fuel level within the tank determines the position of the indicator needle 56 relative to the outer shell 32 and indicator dial 60. The float member 44 is buoyant in the fuel such that it maintains a position at the top of the fuel volume within the tank. Because of the twisted shape of the output rod 40, the position of the float member 44 along the main axis A determines the rotational orientation of the output rod 40 and the indicator needle 56. The fuel cap 20 is calibrated to indicate the correct amount of remaining fuel with the indicator needle 56 and the indicia 64 on the indicator dial 60. The recessed portion 46 of the float member 44 fits down over the end cap 54 when the float member 44 is at the bottommost or "empty" position. By arranging the float member 44 lower along the main axis A, the "empty" indication is more accurate. By lowering the center of mass of the float member 44 toward the first end 40a of the output rod 40 and the end cap 54, the float member 44 will attain a position that is closer to the bottom of the tank and the true "empty" condition before indicating that the tank is "empty".

Figure 6:
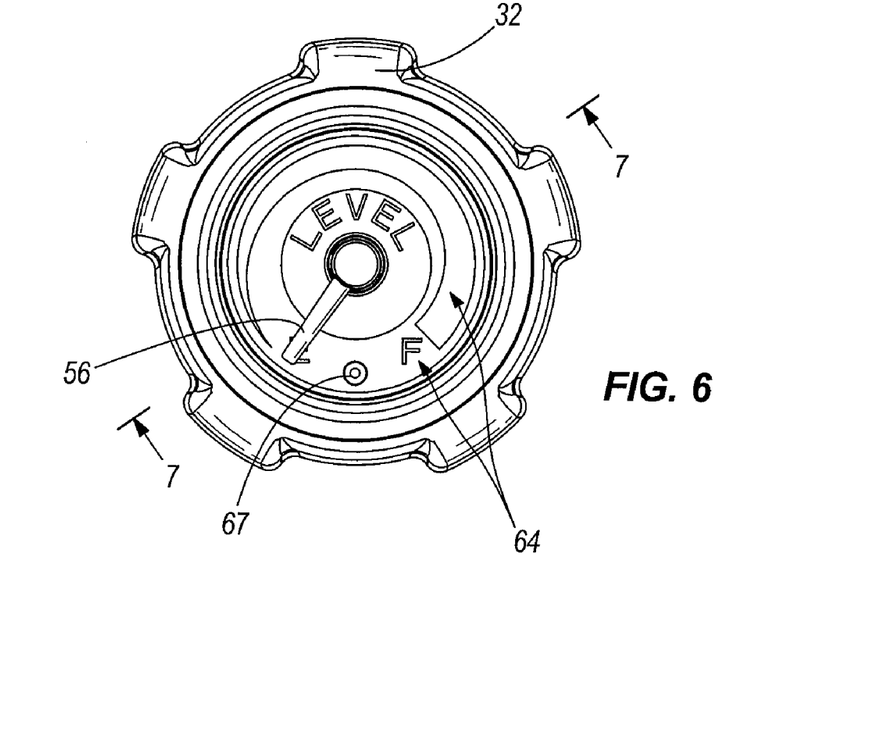
FIG. 6 is a top view of the fuel cap of FIGS. 1-5.
Figure 7:
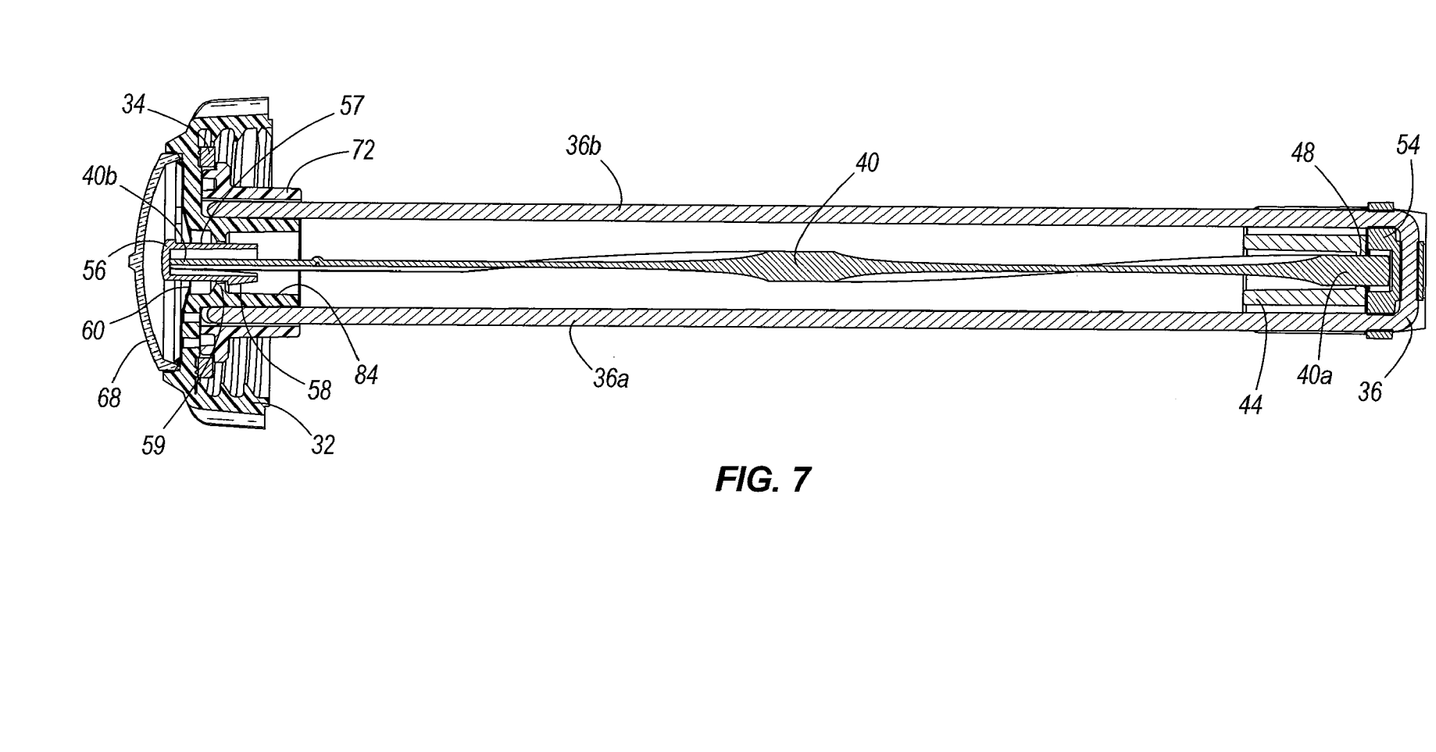
FIG. 7 is a cross-sectional view of the fuel cap taken along line 7-7 of FIG. 6.
Figure 8:
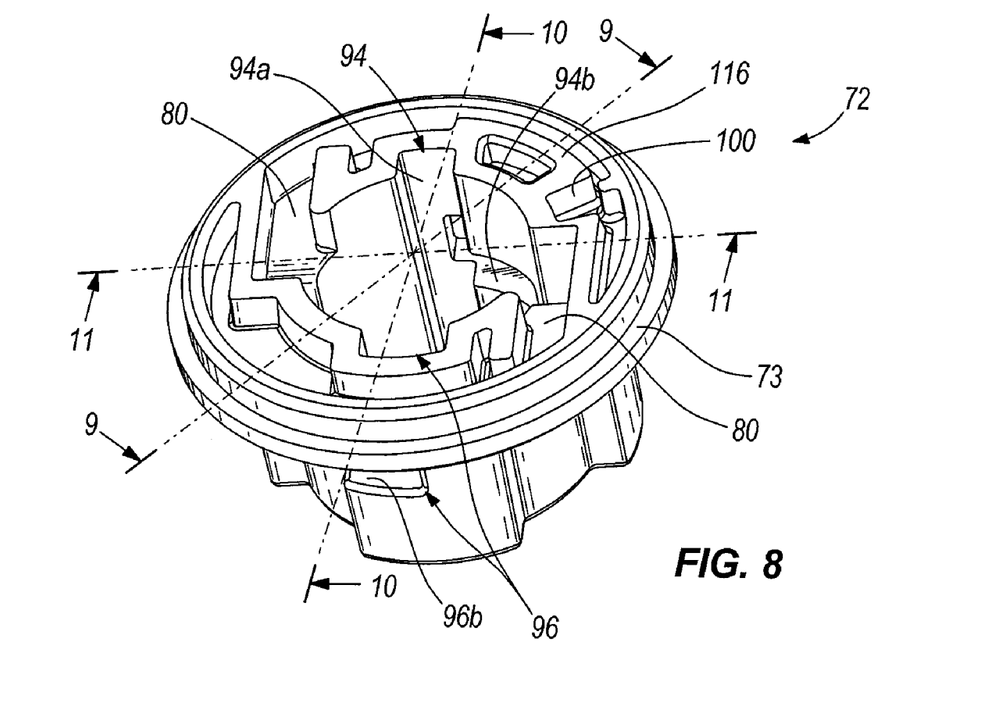
FIG. 8 is a perspective view of an assembly component of the fuel cap of FIGS. 1-7.
Figure 9:
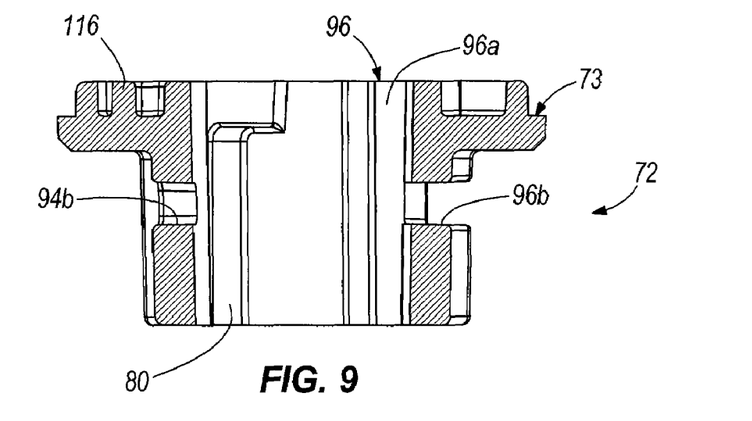
FIG. 9 is a first cross-sectional view of the assembly component taken along line 9-9 of FIG. 8.
Figure 10:
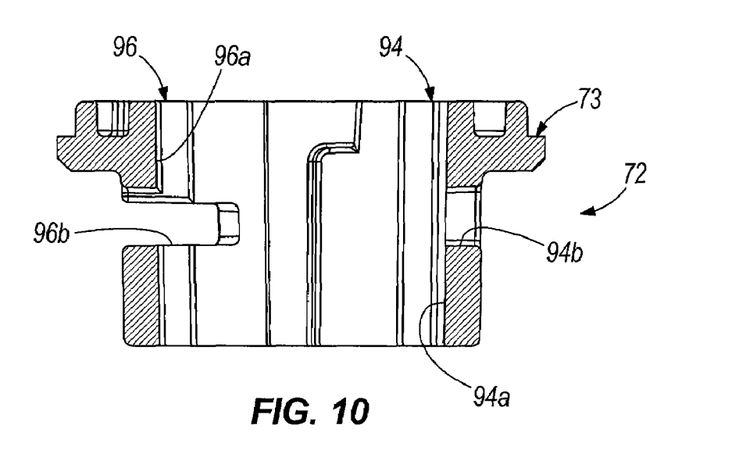
FIG. 10 is a first cross-sectional view of the assembly component taken along line 10-10 of FIG. 8.
Figure 11:
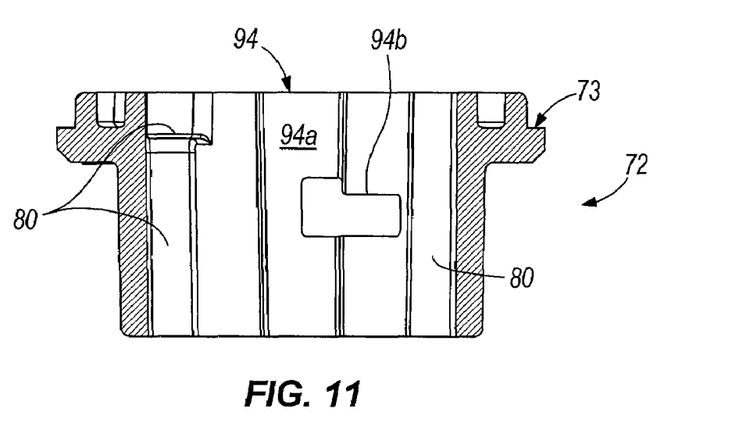
FIG. 11 is a first cross-sectional view of the assembly component taken along line 11-11 of FIG. 8.

The indicia 64 may be provided in one of a multitude of known manners. In the illustrated embodiment (as shown in FIGS. 2 and 6), the indicator dial 60 is provided with a single band of increasing width between the "empty" and "full" symbols. Alternately, individual fractional markers (either numeric or symbolic) can be provided as indicia on the indicator dial 60.

What is claimed is:

1. A fuel cap operable to close an opening of a fuel tank, the cap comprising:
   an outer shell including a protrusion and a shell locking member;
   a detection mechanism for sensing a level of fuel within the tank; and
   an assembly component engageable with the outer shell to support the detection mechanism on the outer shell, the assembly component defining a groove operable to receive the protrusion, the assembly component including a component locking member;
   wherein the outer shell and the assembly component are engageable with one another by a relative axial movement followed by a relative rotational movement about an axis, and, once engaged, are fixed against disengagement by engagement of the shell locking member and the component locking member.

2. The fuel cap of claim 1, wherein one of the shell locking member and the component locking member includes a flexible snap finger, and wherein the other of the shell locking member and the component locking member includes a recess operable to receive the finger.

3. The fuel cap of claim 2, wherein the shell locking member includes the flexible snap finger, and wherein the component locking member includes the recess.

4. The fuel cap of claim 3, wherein the snap finger is configured to deflect during the relative rotational movement and to engage the recess upon completion of the rotational engagement of the outer shell and the assembly component.

5. The fuel cap of claim 2, further comprising an indicator dial cooperating with the detection mechanism and including indicia for displaying the level of fuel, the indicator dial being positioned on top of the snap finger.

6. The fuel cap of claim 1, wherein the outer shell includes a second protrusion, and wherein the assembly component includes a second groove operable to receive the second protrusion.

7. The fuel cap of claim 6, wherein the first protrusion and the second protrusion are sized to allow the outer shell and the assembly component to be engaged in only a predetermined orientation.

8. The fuel cap of claim 1, further comprising a sealing element positioned between the outer shell and the assembly component.

9. A fuel cap for closing an opening of a fuel tank and for displaying a level of fuel in the tank, the cap comprising:
   an outer shell having an interior region, the outer shell including a first protrusion and a second protrusion having different proportions and extending into the interior region;
   a detection mechanism for sensing and responding to the level of fuel in the tank; and
   an assembly component defining grooves for receiving a portion of the detection mechanism, the assembly component defining a first slot and a second slot for respectively engaging the first protrusion and the second protrusion.

10. The fuel cap of claim 9, wherein the outer shell is formed with a boss in the interior region, the first protrusion and the second protrusion extending laterally from the boss.

11. The fuel cap of claim 9, wherein the first slot and the second slot each include a portion parallel to an axis of rotation of the fuel cap and a portion normal to the axis of rotation.

12. The fuel cap of claim 9, wherein the outer shell includes a snap lever operable to prevent substantial relative rotation between the outer shell and the assembly component after engagement.

13. The fuel cap of claim 9, wherein the assembly component includes a flange cooperating to retain a sealing element when engaged with the outer shell.

14. A method of assembling a fuel cap for closing an opening of a fuel tank, the cap including an outer shell having a protrusion formed thereon, and an assembly component formed with an L-shaped slot including an axial portion and a lateral portion, the method comprising the acts of:
    axially joining the outer shell and the assembly component such that the protrusion is received in the axial portion of the L-shaped slot;
    rotating the outer shell and the assembly component relative to each other about an axis such that the protrusion moves from the axial portion to the lateral portion of the L-shaped slot; and
    automatically locking the outer shell and the assembly component against substantial relative rotation about the axis.

15. The method of claim 14, further comprising the act of trapping a sealing element between the assembly component and the outer shell.

16. The method of claim 14, further comprising the act of engaging a detent formed on a flexible lever of the outer shell with a ridge of the assembly component during the relative rotation of the outer shell and the assembly component.

17. The method of claim 16, further comprising the act of deflecting the flexible lever such that the detent passes over the ridge and into an adjacent recess to prevent substantial relative rotation about the axis.

18. The method of claim 17, further comprising the act of laying an indicator dial onto the outer shell directly over the flexible lever.

19. The method of claim 18, further comprising the acts of:
    laying a substantially transparent lens over the indicator dial; and
    joining the lens to the outer shell.

20. The method of claim 19, further comprising the act of ultrasonically welding the lens to the outer shell.

* * * * *

UNITED STATES PATENT AND TRADEMARK OFFICE
CERTIFICATE OF CORRECTION

PATENT NO. : 7,658,105 B2
APPLICATION NO. : 11/549141
DATED : February 9, 2010
INVENTOR(S) : Michael Joseph Holz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 641 days.

Signed and Sealed this

Twenty-eighth Day of December, 2010

David J. Kappos
*Director of the United States Patent and Trademark Office*